(12) United States Patent
Satori et al.

(10) Patent No.: US 6,443,438 B2
(45) Date of Patent: Sep. 3, 2002

(54) FLUID-SEALED ANTI-VIBRATION DEVICE

(75) Inventors: Kazutoshi Satori; Toru Sakamoto, both of Saitama (JP)

(73) Assignee: Yamashita Rubber Kabushiki Kaisha, Saitama (JP)

( * ) Notice: Subject to any disclaimer, the term of this patent is extended or adjusted under 35 U.S.C. 154(b) by 0 days.

(21) Appl. No.: 09/749,829

(22) Filed: Dec. 28, 2000

(30) Foreign Application Priority Data

Dec. 28, 1999 (JP) .......................... H11-373799
Sep. 19, 2000 (JP) .......................... 2000-284387
Sep. 19, 2000 (JP) .......................... 2000-284388

(51) Int. Cl.$^7$ .................................. F16F 5/00
(52) U.S. Cl. .................................. 267/140.13; 267/219
(58) Field of Search .................. 267/140.13, 140.11, 267/140.14, 140.15, 219; 248/562, 636

(56) References Cited

U.S. PATENT DOCUMENTS

| 4,750,719 A | * | 6/1988 | Hartel | 267/219 |
| 4,805,884 A | * | 2/1989 | Jordens et al. | 267/140.14 |
| 5,501,433 A | | 3/1996 | Satori | 267/140.13 |
| 5,927,698 A | * | 7/1999 | Miyoshi et al. | 267/140.13 |

FOREIGN PATENT DOCUMENTS

| DE | 3618767 A1 | * | 12/1987 | 267/219 |
| JP | 03144134 A | * | 6/1991 | 267/140.13 |
| JP | 2799953 | | 7/1998 | |

* cited by examiner

Primary Examiner—Jack Lavinder
Assistant Examiner—Mariano Sy
(74) Attorney, Agent, or Firm—Birch, Stewart Kolasch & Birch, LLP (57) ABSTRACT

A cone-shaped mounting (1) is provided in which a main fluid chamber (10) is formed by a first connecting member (3) a second connecting member (5), an elastic body member (7), a partition member (8) and a first orifice passage (15). A part of an elastic wall of the main fluid chamber (10) is an inner wall of the elastic body member (7). The first orifice (15) communicates with a sub-fluid chamber (11). An input direction of a main vibration is arranged to be the Z-axis direction (the vertical direction of a car body). Side fluid chambers (20) and recessed chambers (25) are alternately provided at intervals of 90° in the circumferential direction on the outer circumference of the elastic body member (7). An outer wall of the elastic body member (7) forms a part of an elastic wall of the side fluid chambers (20). A pair of side fluid chambers (20) is disposed in the longitudinal direction of the car body. A second orifice (24) is arranged to communicate with the paired side fluid chambers to provide a cylindrical bushing section (2). The input direction of a main vibration is set in the longitudinal direction of the car body, while the side fluid chambers (20, 20) are arranged in the longitudinal direction thereof. With this arrangement, the vibration in the vertical direction can be reduced by the cone-shaped mounting section (1), the vibration in the longitudinal direction can be reduced by the cylindrical bushing section (2), by the liquid movement between the fluid chambers.

6 Claims, 8 Drawing Sheets

FLUID-SEALED ANTI-VIBRATION DEVICE

BACKGROUND OF THE INVENTION

1. Field of the Invention

The present invention relates to a fluid-sealed anti-vibration device which is used in an engine mounting and the like.

2. Description of the Prior Art

A cone-shaped mounting is known in the prior art wherein a first connecting member secured to a vibration generating side, a second connecting member secured to a vibration receiving side, and a substantially cone-shaped elastic body member for connecting the first and second connecting members are provided, and provided inside the elastic body member is a fluid chamber, of which part of an elastic wall is the elastic body member and which is divided by a partition member into a main fluid chamber and a sub-fluid chamber, and a first orifice passage is provided for communicating with both fluid chambers.

Also, a cylindrical bushing is also known in the prior art wherein inner and outer cylindrical tubes are connected by an elastic member, a plurality of fluid chambers divided by the elastic member in the circumferential direction is provided, and an orifice passage is arranged to communicate with these fluid chambers.

As a cone-shaped mounting, a fluid sealed type anti-vibration rubber device which is provided with a partition member for dividing its inner part into a main fluid chamber and a sub-fluid chamber, a part of which is an elastic membrane which is deformed elastically with change in the internal pressure of the main fluid chamber and an orifice passage provided extending to the partition member for communication between the main fluid chamber and the sub-fluid chamber is known. In the mounting, a partition member comprises an elastic partition member which is integrally formed with an elastic membrane and an orifice portion formed around the elastic membrane and interposed between a first supporting member and a second supporting member, and a boundary portion of the elastic membrane and the orifice portion is clamped by the first supporting member and the second supporting member (see FIG. 4).

In the construction of the mounting, when a stepped portion is formed by projecting upward the central portion of the first supporting member positioned at a main fluid chamber side, a fluid mass section enclosed by this stepped portion is formed on the elastic membrane and the fluid mass section and the main fluid chamber communicate through an opening portion which is provided in this stepped portion, the elastic membrane is deformed elastically by the vibration input to the main chamber, fluid column resonance is generated in this fluid mass section and originating from this fluid column resonance, the maximum value (hereinafter called the peak) and the minimum value (hereinafter called the bottom) can be formed for a dynamic spring characteristic. Thereby, a low dynamic spring effect can be achieved in a wide frequency region.

Decrease in vibration based on flow of a fluid between fluid chambers in the cone-shaped mount is used to decrease the vibration, for example, in the vertical direction (hereinafter referred to as "the Z-axis direction") among vibrations in three axial directions consisting of X, Y, and Z axes at right angles to one another. and therefore the decrease in vibration does not affect the front and rear direction (hereinafter referred to as "the X-axis direction") and the right and left direction (hereinafter referred to as "the Y-axis direction").

In the case of the decrease in vibration based on liquid flow between the fluid chambers in the cylindrical bushing, when the axial direction of the cylindrical bushing is adjusted to the Z-axis direction, if four fluid chambers are formed at intervals of 90° in the circumferential direction and each fluid chamber is arranged in the directions of the X and Y axes, vibrations in each of the X and Y-directions can be decreased by one cylindrical bushing, but the vibration in the Z-axis direction can not be decreased.

Accordingly, to decrease all vibrations in the directions of the three axes, X, Y, and Z, when for example, the cone-shaped mounting and the cylindrical bushing are combined, more than one fluid-sealed anti-vibration device must be provided. In this case, the number of devices becomes many and their arrangement is complicated, increasing the total weight and cost of the device. It is therefore an object of the present invention to decrease all vibrations in the directions of the three axes, X, Y, and Z by the vibration decrease, based on the liquid flow between the fluid chambers in one fluid-sealed anti-vibration device.

Also, in the construction of the cone-shaped mounting, a partition member comprises an elastic partition member interposed between a first supporting member and a second supporting member, a boundary portion of the elastic membrane and the orifice portion is clamped by the first and supporting member, and tension of the elastic member is decided by the clamping amount, that is, a clamping overlap width. Resonance frequency of the elastic membrane portion is decided by tension thereof.

If the resonance frequency of the elastic membrane portion can be tuned by controlling the clamping width, fluid column resonance in the fluid mass section can be freely tuned through optional tuning of the resonance frequency of the elastic membrane portion. However, the controlling of the clamping width feasible only in the direction which lowers its tension by reducing the clamping width. It is therefore desired to enlarge the tuning width, as it is relatively narrow.

Further, when the stepped portion projecting from the first supporting member into the main fluid chamber and a bevel member vibrating within the main fluid chamber in an integral manner with the elastic body member, it is necessary to secure a certain clearance h between the bevel member and the stepped portion. Therefore, the overall height of the engine mount becomes high and the size becomes large, correspondingly. It is therefore an object of the present invention to expand the tuning width of resonance frequency of the elastic membrane and realize an entire fluid sealed anti-vibration device compact in size.

SUMMARY OF THE INVENTION

The primary object of the present invention is to overcome the above-mentioned problems and to provide a fluid-sealed anti-vibration device comprising a cone-shaped mounting section and a cylindrical bushing section, wherein the cone-shaped mounting section comprises a first connecting member secured to a vibration generating side, a second connecting member secured to a vibration receiving side, a substantially cone-shaped elastic body member for connecting the first and second connecting members, a fluid chamber of which part of an elastic wall is the elastic body member and which is divided by a partition member into a main fluid chamber and a sub-fluid chamber, and a first orifice passage for communicating with the main and sub-fluid chambers, and the cylindrical bushing section comprises a plurality of side fluid chambers which are provided in a circumferential direction at a predetermined intervals on the outer circumference of the elastic body member and of which part of an elastic wall is the elastic body member, and a second orifice passage for communicating with each of the side fluid chambers, characterized in that the cylindrical bushing section and the cone-shaped mounting section are integrally provided.

According to a second object of the present invention, the cylindrical bushing section is provided with the side fluid chambers and open recess chambers which are alternately formed in the circumferential direction, and a bottom section of the recess chamber is a thin section of the elastic body member in the cone-shaped mounting section.

According to a third object of the present invention, the side fluid chambers are paired at intervals of 180° in the circumferential direction, each of which is arranged in the front and rear direction of a car body.

According to a fourth object, the cone-shaped mounting section and the cylindrical bushing section use the first and second connecting members in common.

According to a fifth object, the partition member is provided as two overlapping members which are temporarily integrated by engaging a tapered hole formed on one of the two members with a tapered projection formed on the other.

According to a sixth object, a fluid sealed anti-vibration rubber device of this invention is provided with an elastic membrane which is deformed elastically with the change in the internal pressure of the main fluid chamber and which is provided as a part of the partition member, the partition member comprises an elastic partition member which forms a fluid mass concave section opening toward the main fluid chamber on the elastic membrane in one unit with a ring-shaped vertical wall portion enclosing the elastic membrane, and a first supporting member and a second supporting member, each of which has an open portion formed on the elastic membrane equivalent portions for clamping the elastic partition member from the front and back sides, and a projecting portion is provided at the portion contacting the ring-shaped vertical wall portion of the first supporting member, and the ring-shaped vertical wall portion is turned down in the central direction or in the opposite outward direction of the elastic membrane by this projecting portion.

The fluid-sealed anti-vibration device of the first object uses the elastic body member of the cone-shaped mounting section and the cylindrical bushing section is formed on the circumference of the elastic body member. In this manner, both functions of the conventional cone-shaped mounting and the cylindrical bushing can be displayed at the same time in spite of being a single device. For example, when a main vibration input direction of the cone-shaped mounting section is arranged to be the Z-axis direction and a main vibration input direction of the cylindrical bush section is arranged to be the X-axis direction, if a pair of side fluid chambers in the cylindrical bushing is also arranged in the X-axis direction, each vibration in the directions of the X and Z axes can be eliminated at the same time based on the liquid flow between the fluid chambers in a single device. Further, if a pair of fluid chambers in the cylindrical bushing is arranged in the Y-axis direction, it is possible to decrease the vibration based on the liquid flow between fluid chambers relative to vibration input from the Y-axis direction. It is also possible to reduce the vibrations based on the liquid flow between the fluid chambers relative to vibrations input from the directions of the X and Y axes if a pair of fluid chambers is arranged in the directions of the X and Y axes respectively.

The elastic body member is integrally provided so that it is used in common as an elastic wall forming each fluid chamber of the cone-shaped mounting section and the cylindrical bushing section. It is therefore possible to reduce the number of parts and to provide a compact and lightweight device. The number of anti-vibration devices to be used for obtaining the same effect can be reduced by half. It is therefore possible to simplify the arrangement and reduce the weight and cost.

The side fluid chamber of the cylindrical bushing section has a substantially triangle cross-section and the elastic body member of the cone-shaped mounting section is used as a part of the wall forming the side fluid chamber. Thus, when the cylindrical bushing section is formed on the periphery (circumference) of the cone-shaped mounting section, it is not necessary to increase each measurement of height and width in a single cone-shaped mounting section. Accordingly, because substantial installation space can be set to the same space as the case of a single cone-shaped mounting section, a remarkably compact body is realized.

According to the second object, because of the provision of the recess chamber and the thin section, the device can absorb a large input of vibration and improve the durability. Further, since the bottom section of the recess chamber in the cylindrical bushing section is provided with a thin section, a section of the recess chamber of the elastic body member surrounding the main fluid chamber of the cone-shaped mounting section becomes a thin section. If the thin section is set to resonate in a medium frequency range, membrane resonance is generated by input vibration in the medium frequency range to the device so as to realize a low dynamic spring effect in the medium frequency range of the cone-shape mounting section.

According to the third object, the main vibration input direction of the cone-shaped mounting section is arranged in the vertical direction of the car body, the main vibration input direction of the cylindrical bushing section is arranged in the longitudinal direction of the car body, and a pair of side fluid chambers in the cylindrical bushing section is arranged in the longitudinal direction of the car body, each vibration in the vertical direction and the longitudinal direction of the car body which is often required for the purpose of anti-vibration can be eliminated at the same time based on the liquid flow between the fluid chambers in the single device.

According to the fourth object, the first connecting member, the second connecting member, and the elastic body member can be used in common with the cone-shaped mounting section and the cylindrical bushing section. It is therefore possible to reduce the number of parts to simplify the construction, whereby the device can be lightened as a whole and a compact construction can be realized compared with the prior art in which separate anti-vibration devices had to be simply integrated. Further, it is possible to reduce the number of devices by half and the arrangement can be simplified compared with the case where the same effect is obtained in the prior art.

According to the fifth object, two members forming the partition member are temporarily integrated by engaging the tapered projection with the tapered hole. It is therefore possible to handle the partition member as a single integrated part during assembling and realize an easy assembly.

According to the sixth object, a ring-shaped vertical wall portion enclosing an elastic membrane is formed on an elastic partition member and when this ring shape vertical wall portion is clamped by first and second supporting members, a clamping overlap width becomes large. Furthermore, when the ring-shaped vertical wall portion is turned down in the central direction of the elastic membrane by the projecting portion which is formed on the first supporting member, it is possible to lower the tension of the elastic membrane, and when the ring-shaped vertical wall portion is turned outward (the opposite direction to the central direction), the tension of the elastic membrane can be raised. Thus, when the tension is raised, the resonance frequency of the elastic membrane can be raised and when the tension is lowered, the resonance frequency can be lowered. So, it becomes possible to raise and lower the resonance frequency of the elastic membrane by changing its tension. As a result, the tuning width of fluid column resonance in the fluid massed concave portion can be expanded.

Furthermore, because the fluid massed concave portion is provided in the elastic partition member, the first supporting member can be made in a flat shape. As a result, it is not necessary to project the central portion into the main fluid chamber and it becomes possible to make the entire fluid sealed anti-vibration rubber device in a compact size accordingly.

BRIEF DESCRIPTION OF THE DRAWINGS

The above and other object, features and advantages of the present invention will become more apparent from the following description when taken in conjunction with the accompanying drawings.

DETAILED DESCRIPTION OF THE PREFERRED EMBODIMENTS

Figure 1:
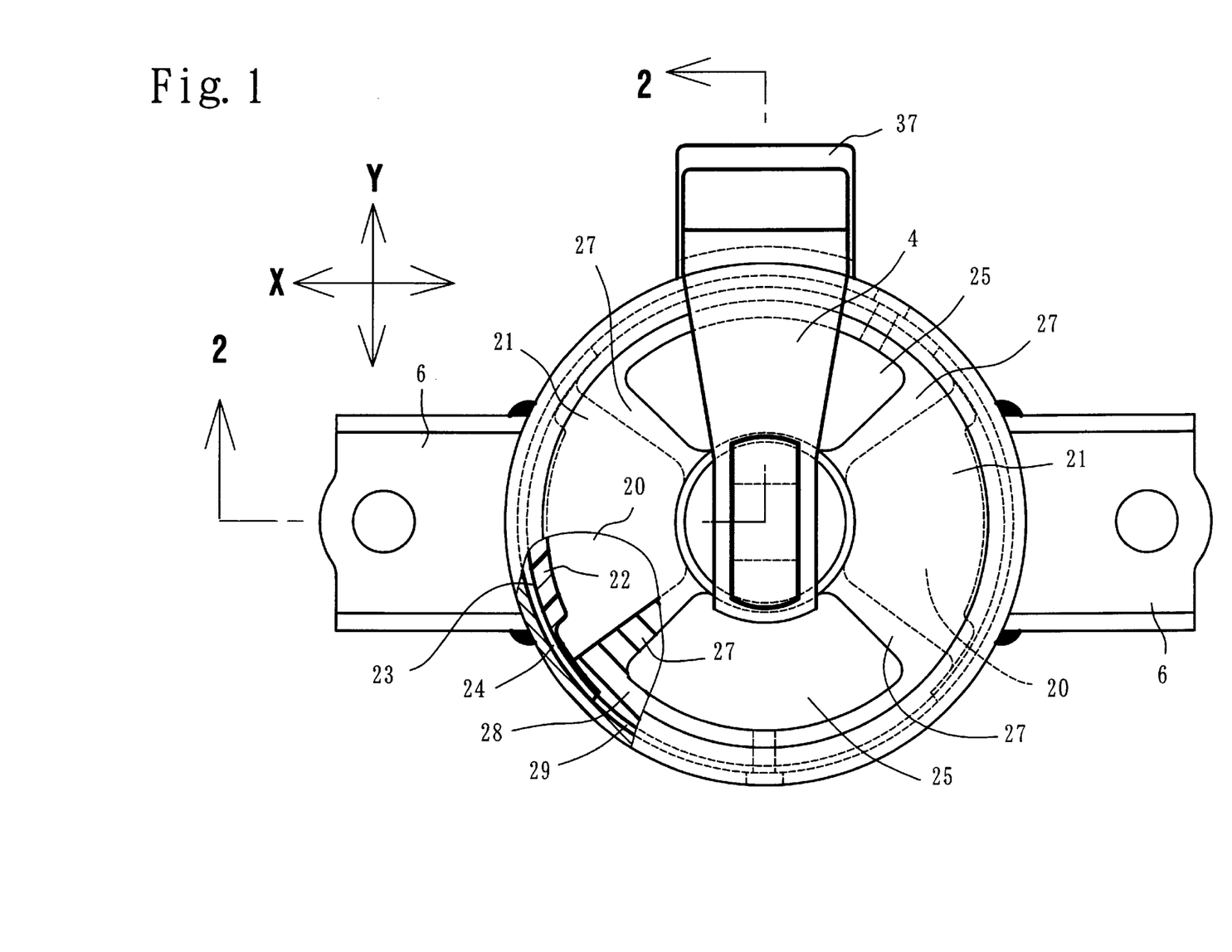
FIG. 1 is a view showing an engine mounting according to a first embodiment from the top.
Figure 2:
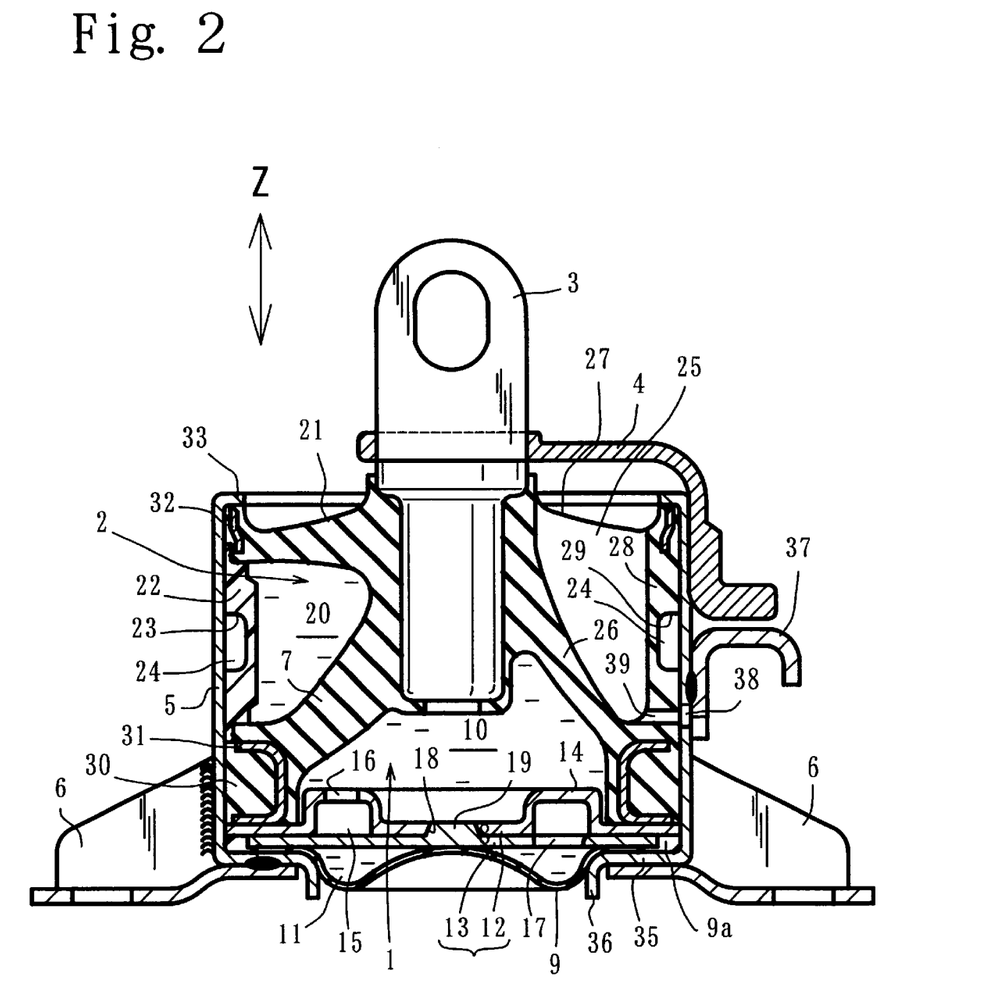
FIG. 2 is a cross-sectional view taken along line 2—2 of FIG. 1.
Figure 3:
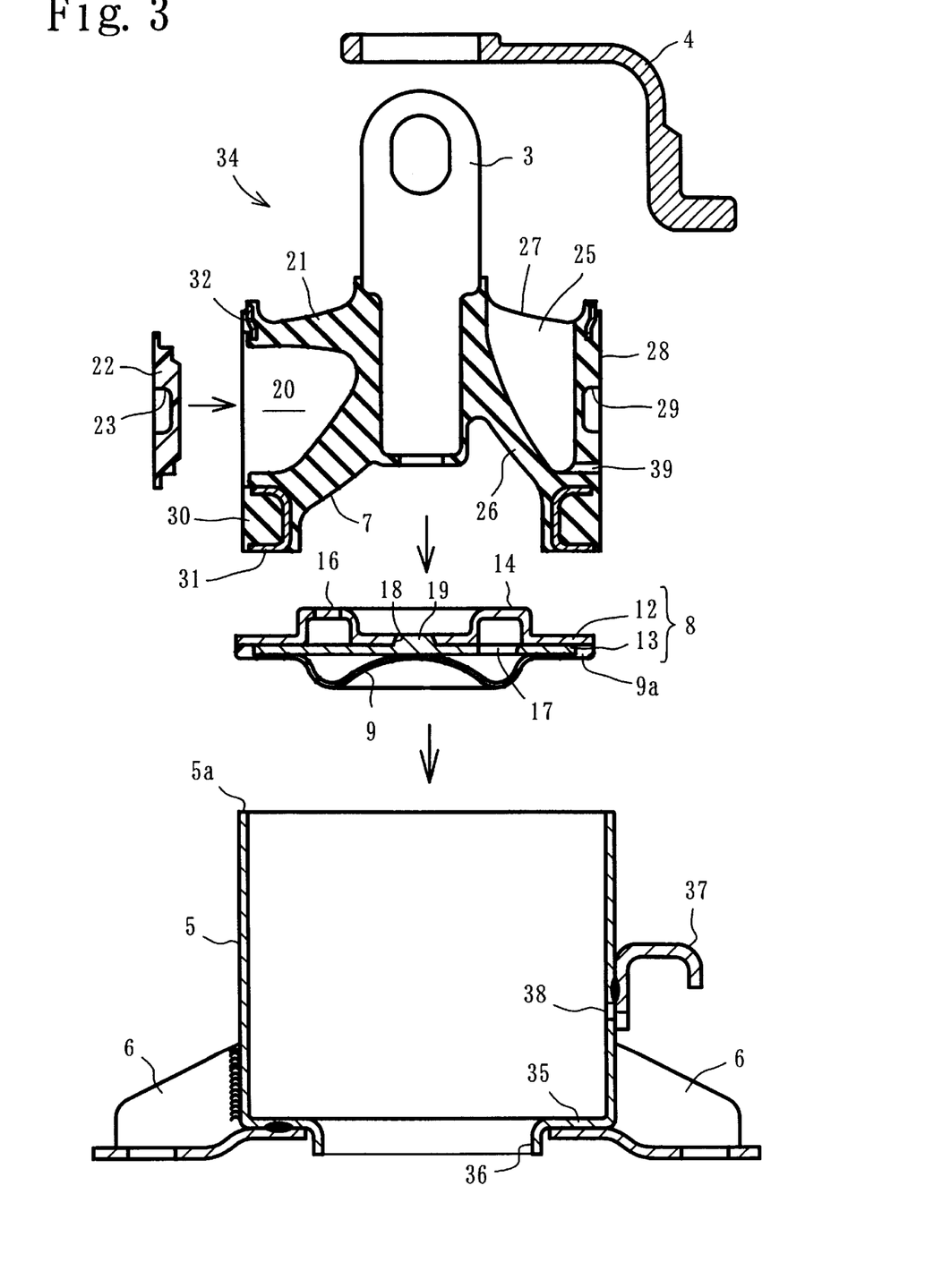
FIG. 3 is an exploded view of the engine amounting according to the first embodiment.

A first embodiment that is constructed as an engine mounting for a vehicle will be described below with reference to the accompanying drawings. FIG. 1 is a view showing the engine mounting from the top when a car body is installed in the Z-axis direction. FIG. 2 is a cross-sectional view of the entire engine mounting at a 90° difference (the cross-sectional view taken along line 2—2 of FIG. 1), and FIG. 3 is an exploded view of the major components of the engine mounting. In the following description, the lateral direction in FIG. 1 (the longitudinal direction when a car body is installed) is referred to as the X-axis direction, the vertical direction (the lateral direction when the car body is installed) is referred to as the Y-axis direction. The vertical direction of FIG. 2 (the vertical direction when the car body is installed) is referred to as the Z-axis direction.

In these figures, a cone-shaped mounting section 1 is integrally formed with a cylindrical bushing section 2 to provide this engine mounting. The cone-shaped mounting section 1 is provided with a first connecting member 3 which is secured to an engine, a second connecting member 5 which is constructed as a cylinder-shaped rigid outer frame that surrounds the periphery at intervals, and a substantially cone-shaped elastic body member 7 for connecting the first connecting member 3 and the second connecting member 5. One end of a stopper 4 with a substantially L-shaped cross-section is secured to the first connecting member 3. The second connecting member 5 is provided with a car body side bracket 6 which is welded to the car body.

The axial center direction of the first connecting member 3 agrees with the Z-axis direction which is the input direction of the main vibration in the cone-shaped mount section 1. A part of the first connecting member 3 which is embedded within the elastic body member 7 is columnar, has a diameter in the lower section narrower than a step provided in the upper section, and extends alone the Z-axis direction. A part of the first connecting member 3 projecting from the elastic body member 7 is flat and is connected to the stopper 4.

A substantially cone-shaped space formed by the elastic body member 7 is fluid chamber opening downwards as shown in FIGS. 2 and 3, and a partition member 8 and a diaphragm 9 are secured to this open section. Provided between the inner wall of the elastic body member 7 and the partition member 8 is a main fluid chamber 10 of which part of the elastic wall is the elastic body member 7. A sub-fluid chamber 1.1 is formed between the partition member 8 and the diaphragm 9. In this manner, the partition member 8 divides the fluid chamber into the main fluid chamber 10 and the sub-fluid chamber 11.

The partition member 8 is composed of a disc 12 made of a suitable resin in a round shape when viewed from the Z-axis and a pressure plate 13, of a smaller diameter than the disc 12, overlapping on the surface of the sub-fluid chamber 11. A first orifice passage 15 is formed between the inside of an arc-shaped projection 14 formed on the resin disc 12 projecting into the main fluid chamber 10, and the pressure plate 13. An inlet 16 formed in the arc-shaped projection 14 and an outlet 17 formed in the pressure plate 13 always communicate with the main fluid chamber 10 and the sub-fluid chamber 11 to serve as damping orifices for absorbing vibrations of a small amplitude and low frequency range during general running of the vehicle.

A central part of the resin disc 12 is provided with a tapered hole 18 which penetrates the front and back of the disc 12 and of which the wall is tapered. On the other hand, the central part of the pressure plate 13 is provided with a tapered projection 19 with a tapered surface in a shape that corresponds to the tapered hole 18. The tapered projection 19 engages the tapered hole 18 to temporarily integrate the resin disc 12 and the pressure plate 13, thereby providing an integrated partition member 8.

The cylindrical bushing section 2 is provided with a plurality of side fluid chambers 20 on the outer circumference of the elastic body member 7. Part of the elastic wall of each chamber 20 is the outer wall of the elastic body member 7. The side fluid chambers 20 are formed as a space with a substantially triangular cross-section, opening laterally, and adapted to be sealed by an end wall 21, which is integrally formed with the elastic body member 7 to extend in a substantially horizontal direction, and a fitting wall member 22 made of resin which is designed to engage the laterally opening section.

The fitting wall member 22 is closely fitted in an arc shape on the inner circumference of the second connecting member 5 in an about ¼ circumferential width. A surface of the fitting wall member 22 contacting the second connecting member 5 (hereinafter referred to as "an outer surface") is provided with a groove 23 extending in the circumferential direction which opens to the second connecting member 5 to provide a second orifice passage 24 between the fitting wall member 22 and the second connecting member 5. The second orifice passage 24 is formed in the circumferential direction along the inner surface of the second connecting member 5 to communicate with a pair of side fluid chambers 20, 20 and serves as a damping orifice passage in the same manner as the first orifice passage 15.

Further, the cylindrical bushing section 2 is provided with a recess chamber 25 adjacent to the side fluid chamber 20. As shown in FIG. 1, the cylindrical bushing section 2 is provided on the outer circumference of the elastic body member 7 with two side fluid chambers 20 and two recessed chambers 25 adjacently at intervals of 90° in the circumferential direction, wherein the paired side fluid chambers 20, 20 and recessed chambers 25, 25 are situated at intervals of 180° relative to the central section on the opposite side. The paired side fluid chambers 20, 20 are arranged on the X-axis which is the input direction of the main vibration in the cylindrical bushing section 2.

The recessed chamber 25 opens upwards in FIG. 2 and is enclosed by an elastic wall consisting of a thin section 26, an elastic partition wall 27 and a sidewall 28. The thin section 26 forms a bottom section of the recess chamber 25 to partition the main fluid chamber 10. The thin section 26 is formed by particularly thinning a part of the elastic body member 7 and is designed to generate membrane resonance by the input of vibration when the membrane vibration is in the middle frequency range.

The elastic partition walls 27 partition the side fluid chambers 20 and as is obvious in FIG. 1, each is formed in the radial direction and is also formed as a thin elastic wall having the same membrane resonance characteristics as the thin section 26. The sidewall 28 is closely fitted to the inner surface of the second connecting member 5 and is formed integrally with the thin section 26 and the elastic partition wall 27. The outer surface of the sidewall 28 is provided with a groove 29 the same as the groove 23 to provide the second orifice 24.

An end of the elastic body member 7 and one end of the side wall 28 form an enlarged section 30 in which a ring 31 of a C-shaped cross-section is integrally embedded. Only the lower surface of the ring 31 is exposed to contact the upper surface of the partition member 8 for positioning. The enlarged section 30 closely contact the inner surface of the second connecting member 5 and the lower end of the fitting wall member 22 for sealing. A ring 32 of an S-shaped cross-section is also embedded in the end wall 21 and the upper end of the sidewall 28 and fixedly secured by a caulking section 33 which is formed by bending the upper end of the second connecting member 5 inwardly.

The elastic body member 7, the end wall 21, the thin section 26, the elastic partition wall 27, the sidewall 28 and the enlarged section 30 forming the cylindrical bushing section 2 are all integrally constructed in order by the same single elastic member as the elastic body member 7. Because these elastic materials are common to the cone-shaped mounting section 1, the elastic material section of the cone-shaped mounting section 1 except for the diaphragm 9 and the elastic material section of the cylindrical bushing section 2 are integrally formed to provide a single elastic molded product (see FIG. 3). Thus, these can be handled as a single part when the engine mounting is assembled.

A section of the second connection member 5 lower than the partition member 8 is formed with an inwardly folded section 35. The outer peripheral section of the partition member 8 is secured between the folded section 35 and the ring 31. A further inward end 36 of the folded section 35 is folded downward to form a circular wall so that the actuating space of the diaphragm 9 can be secured therein.

A receiving member 37 of a substantially C-shaped cross-section is welded to an intermediate section in the vertical direction of the figure on the outside of the second connecting member 5 and is adapted to contact and receive an end of the stopper 4 moving downward when an excessive load is input to the first connecting member 3. A through-hole 38 in the side of the second connecting member 5 is provided near the welded section of the sidewall 37 to communicate with a drainage hole 39 penetratingly formed at a border section between the through-hole 38 and the thin section 26 of the sidewall 28, to communicate with the inside and the outside in the radial direction, wherein a bent drainage passage of a labyrinthine structure is formed.

To assemble this engine mounting, as shown in FIG. 3, the diaphragm 9 is inserted inside the second connecting member 5 and the outer periphery of the diaphragm 9 is mounted on the inwardly folded section 35. The tapered projection 19 is engaged with the tapered hole 18 to temporarily integrate the resin disc 12 and the pressure plate 13. The integrated partition member 8 is then inserted inside the second connecting member 5 and the outer peripheral section of the resin disc 12 is overlapped on an enlarged outer peripheral edge section 9a of the diaphragm 9. The pressure plate 13 of a small diameter contacts the inside of the outer peripheral edge section 9a. In this condition, the outer peripheral edge section 9a of the diaphragm 9 is inserted between the outer peripheral section of the partition member 8 and the inwardly folded section 35.

Then, an elastic molded unit 34 is inserted into the second connecting member 5. At this time, the side opening section of the side fluid chambers 20 must be blocked in advance by the fitting wall member 22. The ring 31 of the elastic molded unit 34 is placed on the outer peripheral section of the partition member 8 which has been placed on the outer peripheral section of the inwardly folded section 35. An upper end 5a of the second connecting member 5 is inwardly bent to form a caulking section 33 that fixedly secures the ring 32. In this case, the outer peripheral section of the partition member 8 is secured and sealed by the outer peripheral edge section 9a of the diaphragm 9 inserted with the outer peripheral section of the partition member 8 between the ring 31 and the inwardly folded section 35. In this assembly process, an incompressible liquid is filled into the main fluid chamber 10, the sub-fluid chamber 11, and side fluid chambers 20 using a known method.

An operation of the present embodiment will now be described. If the main vibration input direction of the cone-shaped mounting section 1 is the Z-axis direction, and the main vibration input direction of the cylindrical bushing section 2 is the X-axis direction, the vibration in the Z-axis direction is strongly damped by the liquid column resonance of the first orifice 15 in the cone-shaped mounting section 1. With the vibration in the X-axis direction, the liquid flows through the second orifice 24 between the front and rear side fluid chambers 20, 20 when the car body is installed and as a result, liquid column resonance is generated so as to realize a strong damping effect.

By providing the thin sections 26, the thin section 26 resonates in a frequency in a specific middle frequency range for vibration in the Z-axis direction. With this membrane resonance, a low dynamic spring effect can be realized in a specific middle frequency range to absorb vibrations in each of the X and Z-axes directions. Accordingly, each vibration in the X and Z-axes directions can be reduced based on the liquid flow between the fluid chambers, and the low dynamic spring effect can be realized by the membrane resonance in the middle frequency range. It is also possible to efficiently reduce the vibrations at the same time by a single device.

It is optional to select which direction of the X, Y, and Z axes should be anti-vibrated. For example, if the main vibration input direction of the cylindrical bushing section 2 is in the Y-axis direction, it is possible to reduce the vibration in the Y-axis direction. When four side fluid chambers 20 are provided at intervals of 90°, the side fluid chambers 20, 20 are paired at intervals of 180°, and each pair is arranged in the X or Y-axis direction, it is possible to reduce the vibrations in the X and Y-axis directions of at the same time.

By providing the recess chamber 25 and the thin section 26, because the low dynamic spring effect can be realized as a whole device, it is possible to absorb large input of vibrations and to improve the durability. The bottom section of the recessed chamber 25 in the cylindrical bushing section 2 is provided with a thin section 26, and a part of the recessed chamber 25 of the elastic body member 7 en closing the main fluid chamber 10 of the cone-shaped mounting section 1 is provided with a thin section 26. The membrane resonance is generated by the vibration input to the device and it is possible to realize the low dynamic spring effect in the medium frequency range in the cone-shaped mounting section 1.

The side fluid chambers 20 of the cylindrical bushing section 2 are formed in a substantially triangular cross-section and the elastic body member 7 of the cone-shape mounting section 1 is used as a part of a wall of the fluid chamber. Accordingly, even though the cylindrical bushing section 2 is formed on the circumference of the cone-shaped mounting section 1, it is not always necessary to increase each dimension of the height (the Z-axis direction) and width (the X or Y-axis direction) in a single cone-shaped mounting section 1. A substantial amount of the installation space can be the same as that in a single cone-shaped mounting section 1. It is therefore possible to provide a remarkably compact device.

Since the second connecting member 5 is extended upward up to the height of the end wall 21, it is possible to form the cylindrical section of the cylindrical bushing section 2 by utilizing this second connecting member 5. The first connecting member 3 and the second connecting member 5 can also be used as a connecting section for the cylindrical bushing section 2 on the car body side.

Accordingly, the first connecting member 3, the second connecting member 5, and the elastic body member 7 can be used in common with the cone-shaped mounting section 1 and the cylindrical bushing section 2. It is therefore possible to reduce the number of parts to simplify the construction and to provide a light and compact device, although in the prior art, separate anti-vibration devices had to be simply united. Compared with the case where the same effect is obtained in the prior art, it is possible to reduce the number of parts by half and to simplify the arrangement.

The tapered projection 19 of the pressure plate 13 is arranged to engage the tapered hole 18 of the resin disc 12 for temporary integration. It is therefore possible to handle the partition member 8 as a single integrated component during assembly so as to make the production easy. The first orifice 15 is formed between two members of the resin disc 12 and the pressure plate 13 and the peripheral edge section 9a of the diaphragm 9 serves to seal the peripheral sections of the resin disc 12 and the pressure plate 13. It is therefore possible to make the sealing construction of the first orifice 15 easy.

Figure 4:
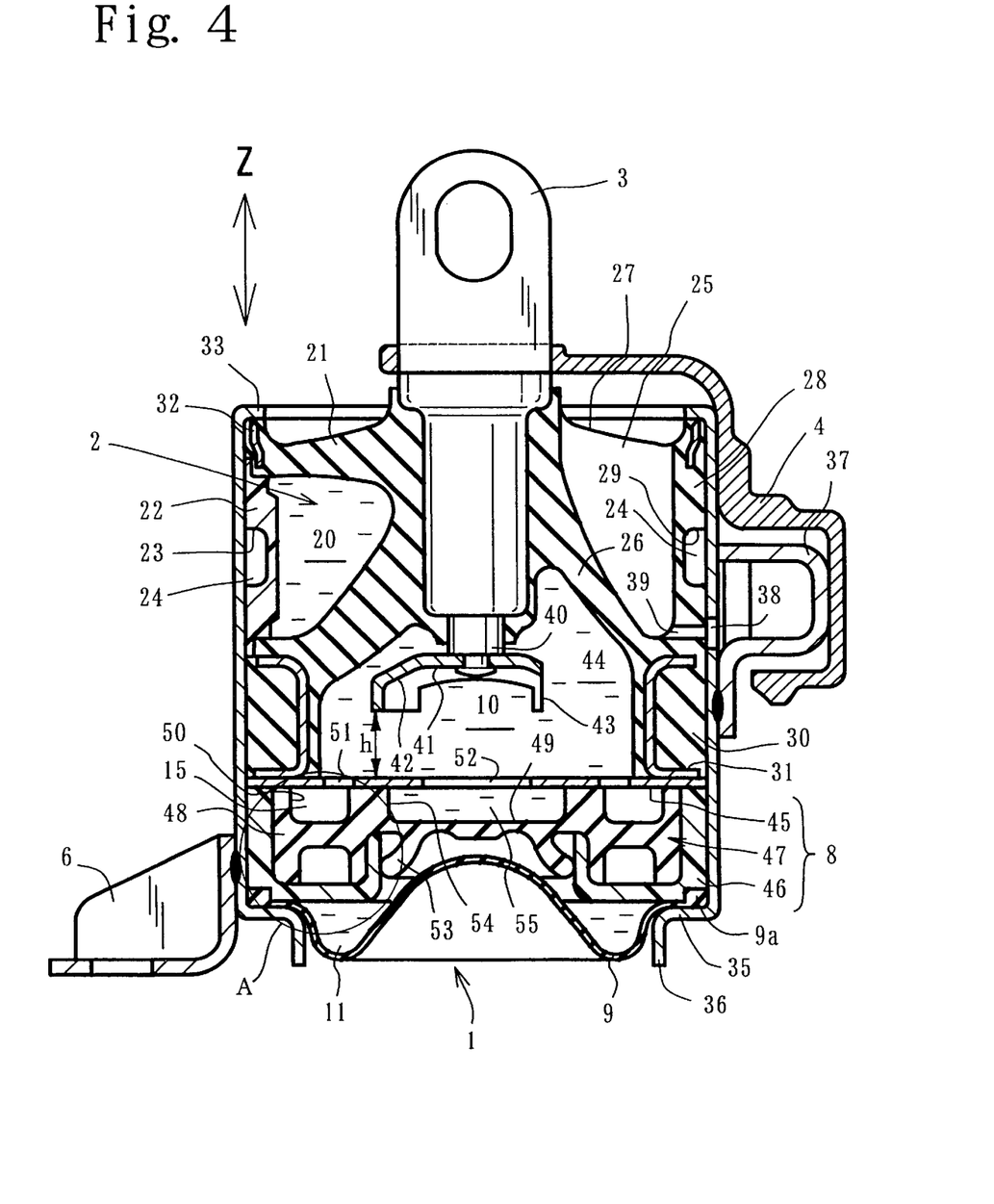
FIG. 4 is a cross-sectional view similar to FIG. 2 according to a second embodiment.

A second embodiment will now be described. FIG. 4 is a view similar to FIG. 1 according to the second embodiment. Since the structure of the cone-shaped mounting section differs only partially from that of the first embodiment, the components in common with the previous embodiment use the same reference numerals and the description for the overlapping section will be omitted in principle.

In FIG. 4, a part of the first connecting member 3 is caused to project into the main fluid chamber 10, and a bevel member 41 is secured to the projecting end, and the distance between the lowest end of the bevel member 41 and the circular plate-shaped member 45 becomes a clearance h. The bevel member 41 is a nearly cup-shaped non-circular member forming a virtual circle when viewed from the direction Z. A circular arc portion 42 in agreement with this virtual circle, and the cut portion 43, which is equivalent to a portion of this virtual circle which is cut along its chord are formed alternately in the peripheral direction at intervals of 90° (FIG. 1 shows a cross-sectional view of the section at 90° to the center line C). The center line C is the principal vibration input direction.

A cut portion 43 formed on a part of the bevel member 41 of the inside wall of the elastic body portion 7 and a portion opposed thereto forms a thinned portion 26 so as to generate membrane resonance in the predetermined frequency of the medium frequency region. The thinned portions 26 are formed in a pair at intervals of 180° around the center line C so as to lie on the cut portion 43 when viewed from the direction of Z.

By providing the cut section 43, when the bevel member 41 vertically moves integrally with the first connecting member 3, a large quantity of liquid in the main fluid chamber 10 is fed into an enlarged space 44 between the cut section 43 and the thin section 26 to increase flow mass of a liquid within the space. Since the thin section 26 is arranged to membrane-resonate in the medium frequency range as in the preceding embodiment, the thin section 26 vibrates from this liquid flow to generate liquid column resonance in the high frequency range within the enlarged space 44.

The partition member 8 consists of a circular plate-shaped member 45, a ring member 46 having an upward opening circular groove, and an elastic member 47 supported between the circular plate-shaped member 45 and the ring member 46. The elastic member 47 consists of an orifice section 48 adapted to engage the inside of the groove of the ring member 46, and an elastic movable membrane section 49 in the center. The orifice section 48 and the elastic movable membrane section 49 are integrally formed from a suitable elastic material such as rubber.

The orifice section 48 is provided with a helical circular groove 50 in two steps which serves as the first orifice 15. The orifice section 48 communicates with the main fluid chamber 10 at an inlet 51 formed on the circular plate-shaped member 45 and also communicates with the sub-fluid chamber 11 from an outlet 56 (not shown in the figure) formed on the bottom section of the ring member 46.

The elastic movable membrane section 49 is elastically deformed in response to a change in internal pressure of the main fluid chamber 10 through an opening 52 formed in the center of the circular plate-shaped member 45 and absorbs the increase in internal pressure so as to enable a low dynamic spring effect as a whole. At this time, an elastic leg 53 integrally formed to project from a lower surface of the elastic movable membrane section 49 toward the sub-fluid chamber 12 in a ring-shaped and opened outward is driven to contact a sidewall 59 of the ring member 46. The contacting force of the elastic leg 53 is changed in response to the elastic deformation of the elastic movable membrane section 49 so as to nonlinearly change a spring constant of the elastic movable membrane section 49.

Formed between the elastic movable membrane section 49 and the circular plate-shaped member 45 is a liquid mass section 55 which is the space enclosed by a ring shape vertical wall portion 54 which is formed at a border section between the orifice section 48 and the elastic movable membrane section 49.

This liquid mass section 55 communicates with the main fluid chamber 10 at an opening 52. An open area of the opening 52 is smaller than that of the elastic movable membrane section 49. The liquid mass section 55 is set to generate liquid column resonance in a specific frequency by the elastic movable membrane section 49 which vibrates from the change of internal pressure in the main fluid chamber 10 as a result of the vibration input from the first connecting member 3. This resonance frequency can be optionally set by the inner liquid mass which is determined by the capacity of the liquid mass section 55, the open area of the opening 52, a spring constant of the elastic movable membrane section 49, and the like.

The ring shape vertical wall portion 54 is formed at the boundary portion between the elastic membrane 49 and an orifice portion 48 which is formed in one unit at the circumference, and its height becomes a clamping overlap width. On the orifice portion 48, a first orifice passage 15 as a damping orifice passage is formed in a spiral shape. The ring shape vertical wall portion 54 is also a part of the wall portion composing this first orifice passage 15.

The first supporting member 45 is made of a proper rigid material such as a metal and at its central part, an opening portion 52 is formed and at its outside, the inlet port 51 is formed to allow the first orifice passage 15 to communicate with the main fluid chamber 10. Further, at the portion in contact with the ring-shaped vertical wall portion 54 of the first supporting member 45, a projecting portion 57 (see FIGS. 5 and 6), which will be described later, is formed in one integral body therewith.

The ring member 46 is made of a proper rigid material such as synthetic resin. A ring shaped groove 58 is formed, into which the orifice portion 48 is fitted and at the central portion, is an opening portion which accommodates the elastic membrane 49 and the leg portion 53 in the space at the central side of the second supporting member 46. The ring shape vertical wall portion 54 is clamped by the end of an inside wall 59 facing this opening portion and the projecting portion 54 of the first supporting member 45. Further, the end of the leg portion 53 is maintained in contact with the inside wall 59 and at a part of the bottom of the ring-shaped groove 58, an exit 56 is formed, through which the first orifice passage 15 and the sub-fluid chamber 11 communicate.

The elastic membrane 49 within the liquid mass section 55 vibrates elastically, which results in the liquid flow in the liquid mass section 55, thereby the liquid column resonance is generated in a lower frequency region than the membrane resonance frequency of the thin section 26. Further, by throttling the open portion 52 to an opening smaller than the area of the elastic membrane 49, controls the energy of fluid column resonance, thereby reducing the difference between the bottom and peak of the dynamic spring characteristics resulting from fluid column resonance and its anti-resonance.

Further, the elastic membrane 49 absorbs the internal pressure rise in the main fluid chamber 10 by deforming elastically, thereby causing vibration of the entire fluid at a low dynamic spring rate. Furthermore, the spring constant of the elastic membrane 49 is changed non-linearly by changing the contact of the leg portion 53 to the inside wall 59 corresponding to the volume of elastic deformation.

Each frequency of liquid column resonance within the liquid mass section 55, membrane resonance of thin section 26 and liquid column resonance between the bevel member 41 and the thin section 26 is arranged to be higher in this order. By each resonance mentioned above, coupling of liquid column resonance of the liquid mass section 55 and membrane resonance of thin section 26, and coupling of membrane resonance of the thin section 26 and liquid column resonance of bevel member 41, a low dynamic spring effect is realized over a wide frequency range from a low to high frequency region.

Also, in the present embodiment, the same arrangement as the preceding embodiment, i.e. the main vibration input direction of the cone-shaped mounting section 1 is in the Z-axis direction, while the side fluid chambers 20, 20 of the cylindrical bushing section 2 are arranged in the X-axis direction. With this arrangement, the vibration in each of the X, Z axis directions can be reduced as a result of strong damping by the liquid flow between the fluid chambers in a single device in the same manner as the preceding embodiment.

With the vibration in the Z-axis direction, as mentioned above, by liquid column resonance in the liquid mass section 55, liquid membrane resonance of the thin section 26, liquid column resonance between the bevel member 41 and the thin section 26, coupling of liquid column resonance of the liquid mass section 55 and membrane resonance of thin section 26 and coupling of membrane resonance of the thin section 26 and liquid column resonance of the bevel member 41, it is possible to realize a low dynamic spring effect in wide frequency range from a low frequency region to a high frequency region and to change the spring constant nonlinearly by the existence of the elastic leg 53.

Figure 5:
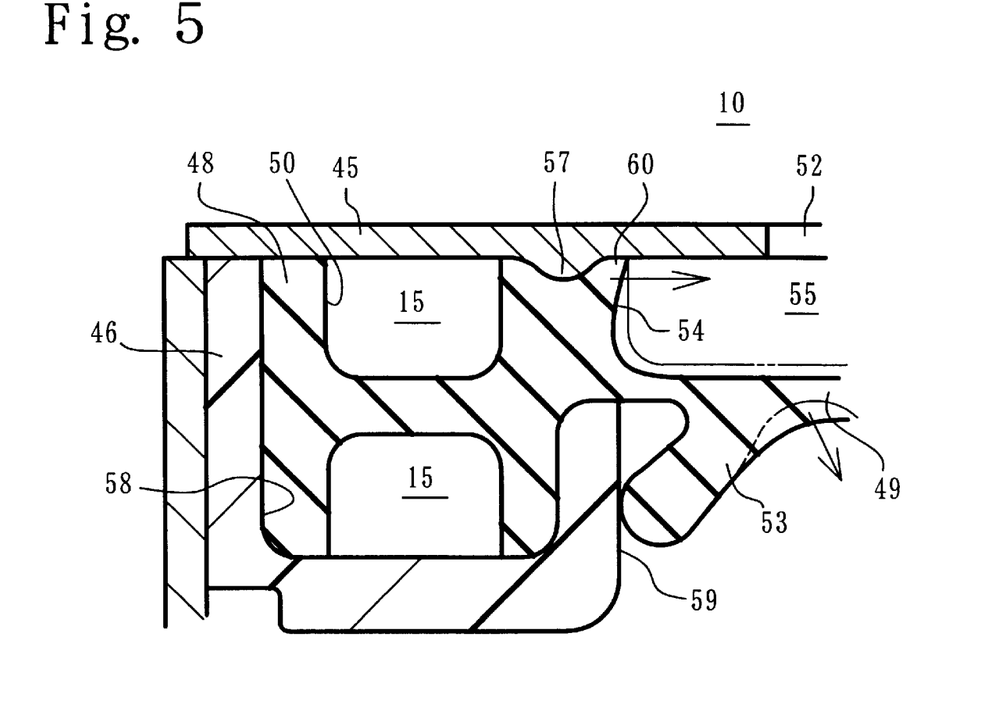
FIG. 5 is an enlarged view of Section A in FIG. 4.
Figure 6:
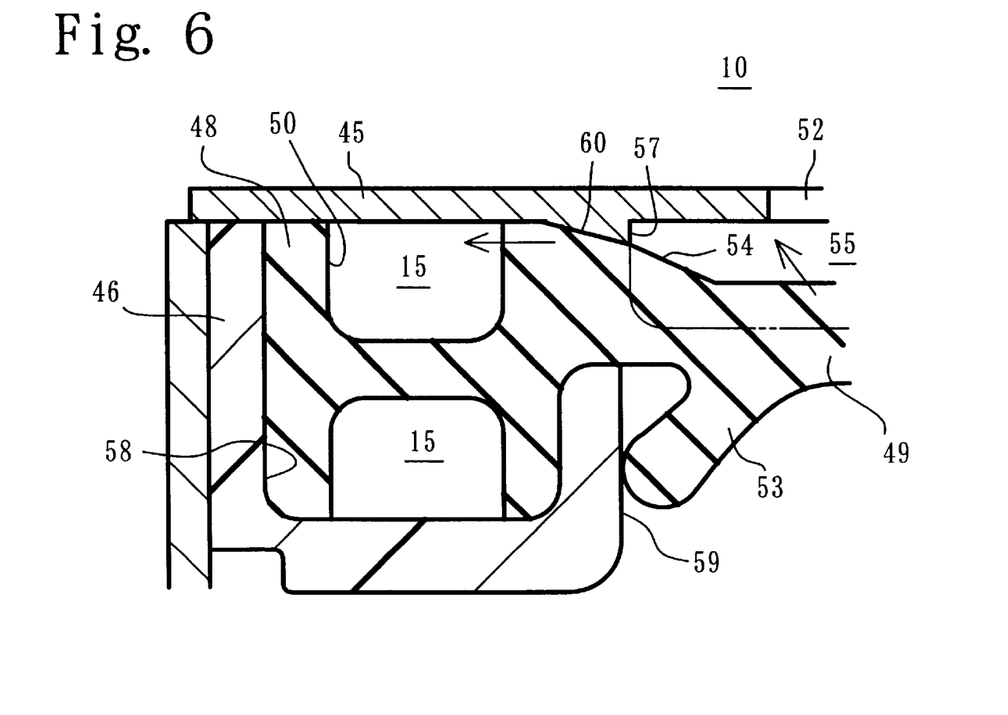
FIG. 6 is a view 5 showing another structure of a projection portion.
Figure 7:
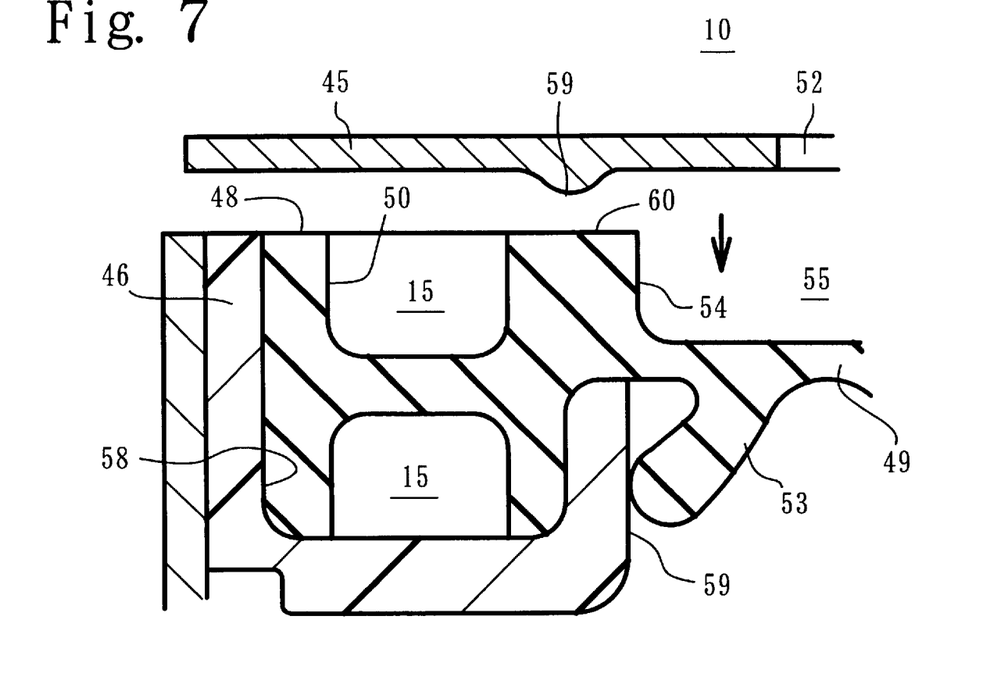
FIG. 7 is a view showing the method of assembly for the device shown in FIG. 5.
Figure 8:
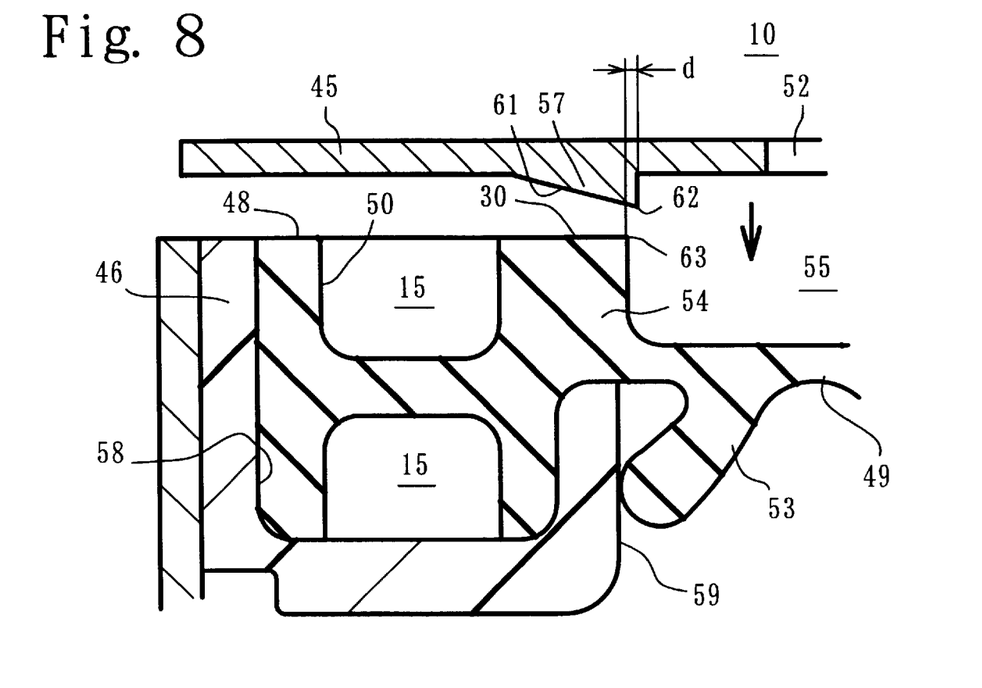
FIG. 8 is a view showing the method of assembly of the device shown in FIG. 6.

The resonance frequency control of the elastic membrane in the present embodiment will be explained. FIGS. 5 to 9 are enlarged views of a part of a parting member in a section A in FIG. 4. FIG. 5 is a diagram showing the state where the resonance frequency of the elastic membrane is tuned in the direction to lower it, FIG. 6 is a diagram showing the state where the resonance frequency is tuned in the direction to raise it, FIG. 7 is a diagram showing how to assemble the engine mount shown in FIG. 5 and FIG. 8 is a diagram showing how to assemble the engine mount shown in FIG. 6.

FIG. 5 is an enlarged view showing the clamping overlap width portion which is Section A shown in FIG. 4. The projecting portion 57 clamps the thick portion at a top portion 60 of the ring shape vertical wall portion 54 and thus, the top portion 60 of the vertical wall portion 54 is turned down in the central inner direction of the elastic membrane. As a result, the elastic membrane 49 is relieved from the basic state shown by the virtual line, and the tension of the elastic membrane is lowered.

On the other hand, as shown in FIG. 6, the projecting portion 57 is provided with a slope upward slanting toward the outside of the elastic membrane 49. The tension of the elastic membrane 49 is raised when the slope is pressed against the inner circumference of the top portion 60 to turn the top portion 60 down to the outside of the elastic membrane 49 and the elastic membrane 49 is pulled up from the basic state shown by the virtual line. Further, the projecting portion 57 shown in FIG. 5 and FIG. 6 may be provided continuously in a circle or may be provided intermittently on a circle at prescribed interval.

To fabricate the device with a structure to relieve tension of the elastic membrane 49 as shown in FIG. 5, it is necessary to press the projecting portion 57 as a semi-circular section, etc. as shown in FIG. 7 against the top portion 60 on an extension of the inside wall 59 or rather on the inner surface. Further, the projecting portion 57 may be formed in an almost triangular section instead of the semi-circular section.

FIG. 8 shows a method of raising the tension of the elastic membrane 49 shown in FIG. 6 by pulling it up. The projecting portion 57 has a triangular cross-section. When a slanting surface 61 is brought in contact with the top portion 60, a top point 62 of the projecting portion 57 is moved lightly to the inside from an inner surface 63 by a dimension d and the projecting portion 57 is pressed against the top portion 60 in this state, the top portion 60 is guided to the slanting surface portion 61, elastically deformed and turned down outward the elastic membrane 49.

Figure 9:
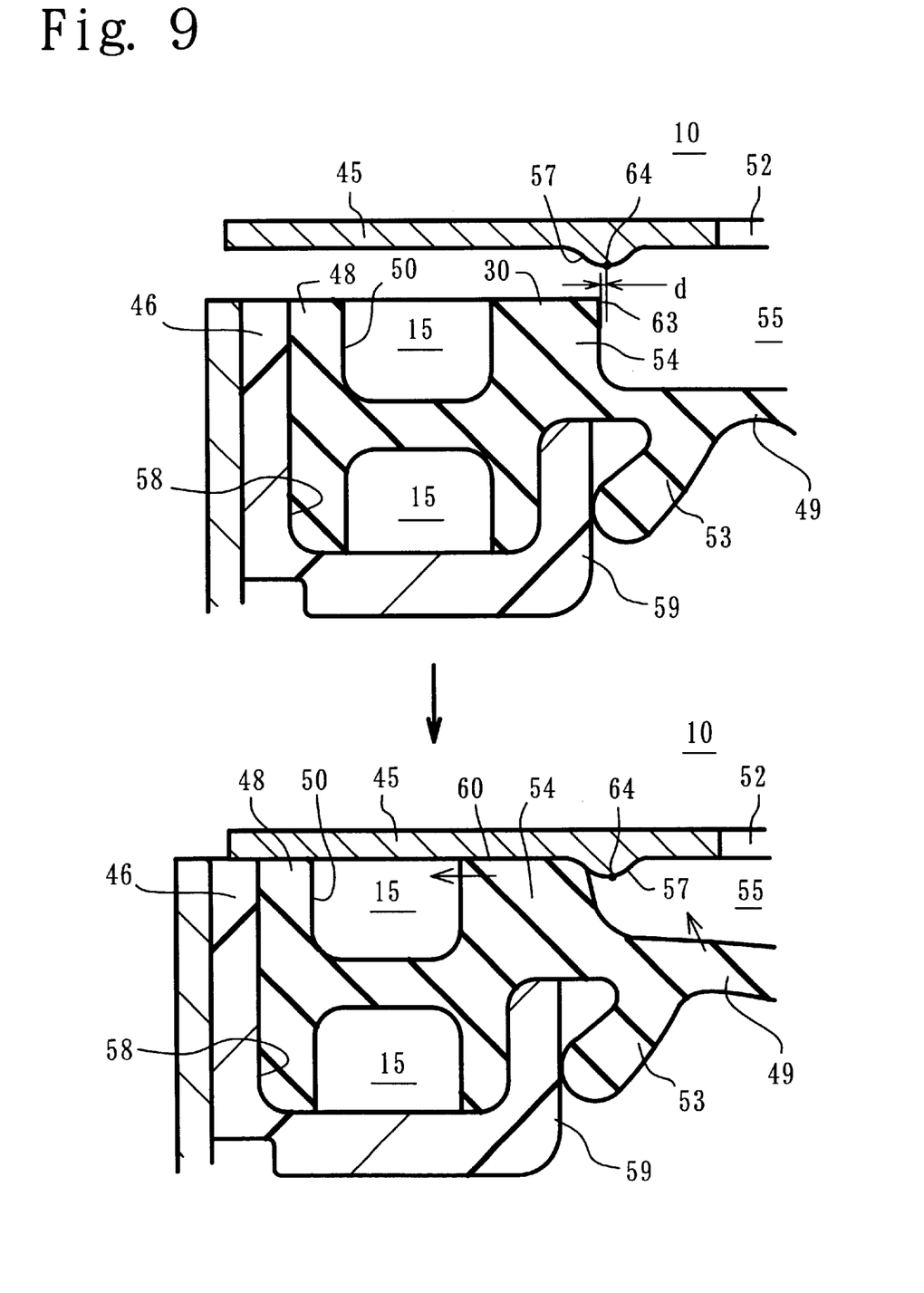
FIG. 9 is a view showing another structure of the projecting portion shown in FIG. 8.

Further, as shown in FIG. 9, the projecting portion 57 may be made in a semi-circular cross-section instead of the triangular cross-sectional shape as shown in FIGS. 5 and 7. In this case, when a semi-circular top point 64 is moved slightly by a dimension d to the inside from the inner surface of the top portion 60 and pressed against it, the top portion is deformed elastically and turned down outward by the side curved surface of the projecting portion 57.

Further, although not illustrated, when the end of the projecting portion 57 in the semi-circular shape is pushed against the top portion 60 at the outer surface rather than an extension line of the inside wall 59, it is also possible to deform the top portion 60 elastically outward in this case.

As mentioned above, the projecting portion 57 is provided on the first supporting member 45 and the ring-shaped vertical wall portion 54 is turned down to the inside or the outside of the elastic membrane 49 by selecting its shape or the position to press the top portion 60. Therefore, when the ring-shaped vertical wall portion 54 is turned down inward, the tension of the elastic membrane 49 is relieved and lowered and as a result, the resonance frequency of the elastic membrane 49 is lowered. On the contrary, when the wall portion 54 is turned outward, the tension is raised and the resonance frequency can be increase.

Figure 10:
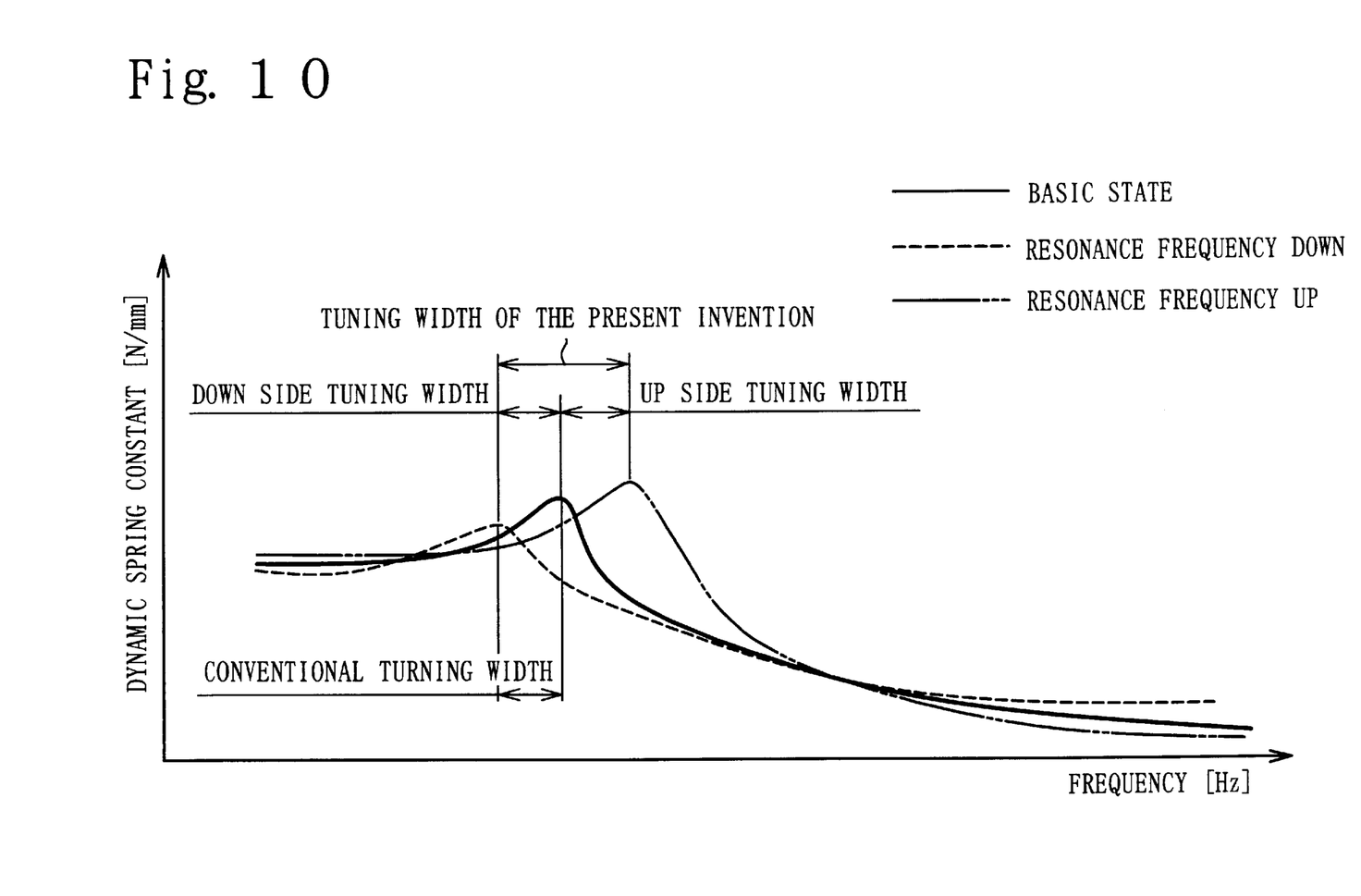
FIG. 10 is a graph showing the resonance frequency tuning of this embodiment.

FIG. 10 show s tuned dynamic spring characteristics. In FIG. 10, the horizontal axis shows frequency and the vertical axis shows the dynamic spring constant. A solid line shows the untuned basic state, a broken line shows the tuned state to lower the resonance frequency of the elastic membrane 49 and a virtual line shows the tuned state to increase the resonance frequency of the elastic membrane, and the frequency at the peak (the maximum value) position of each curve is resonance frequency.

As shown in this graph, when based on the solid line, it becomes possible to lower the resonance frequency of the elastic membrane 49 shown by the broken line and to raise the resonance frequency of the elastic membrane 49 shown by the virtual line. Therefore, resonance frequency can be raised/lowered freely and the tuning width can be expanded remarkably more than the tuning width which can be lowered only as before.

Thus, the resonance frequency of the elastic membrane can be tuned over a wide range and as a result, it becomes possible to freely adjust the fluid column resonance in the fluid inlet concave portion 55. Further, because the fluid mass portion 55 is formed in the elastic partition member 8 by forming the ring-shaped vertical wall 54, it is possible to form the central portion of the first supporting member 45 in a flat shape without having it project into the main fluid chamber 10 as shown in the reference example.

As a result, even when the clearance h is set between the first supporting member 45 and the bevel membrane 41, the overall height of the engine mount can be lowered by the portion of the first supporting member 45 projecting into the main fluid chamber 10 and thus, the entirety of the fluid sealed anti-vibration rubber device can be made compact in size.

Further, the present invention is not restricted to the embodiments described above but various changes and modifications may be made in the principle of the invention. For example, this invention is applicable to various kinds of anti-vibration members in addition to an engine mount as a fluid sealed anti-vibration rubber device.

What is claimed is:

1. A fluid-sealed anti-vibration device, comprising:
    a cone-shaped mounting section, including a first connecting member secured to a vibration generating side, a second connecting member secured to a vibration receiving side and a substantially cone-shaped elastic body member for connecting the first and second connecting members;
    a cylindrical bushing section, said cylindrical bushing section and said cone-shaped mounting section being integrally provided;
    a fluid chamber of which part of an elastic wall is the elastic body member and which is divided by a partition member into a main fluid chamber and a sub-fluid chamber, and a first orifice passage for communicating with the main fluid chamber and the sub-fluid chamber; and
    the cylindrical bushing section including a plurality of side fluid chambers provided in the circumferential direction at predetermined intervals on the outer circumference of the elastic body member and of which part of an elastic wall is the elastic body member and a second orifice passage for communicating with each side fluid chamber, wherein the cylindrical bushing section is alternately provided with side fluid chambers and open recess chambers in the circumferential direction.

2. The fluid-sealed anti-vibration device according to claim 1, wherein the bottom section of the recess chambers is a thin section of the elastic body member in the cone-shaped mounting section.

3. The fluid-sealed anti-vibration device according to claim 1, wherein the side fluid chambers are paired at intervals of 180° in the circumferential direction, each of which is arranged in the front and rear direction of a car body.

4. The fluid-sealed anti-vibration device according to claim 1, wherein the cone-shaped mounting section and the cylindrical bushing section use the first and second connecting members in common.

5. The fluid-sealed anti-vibration device according to claim 1, wherein the partition member is provided as two overlapping members, of which one member is provided with a tapered hole and the other is provided with a tapered projection, wherein the two members are temporarily integrated by causing the tapered projection to engage the tapered hole.

6. The fluid sealed anti-vibration rubber device according to claim 1, wherein the cone-shaped mounting section comprises an elastic membrane which is provided at a part of the partition member and deformed elastically with the change in the internal pressure in the main fluid chamber; the partition member has an elastic partition member which forms a fluid mass portion which opens toward the main fluid chamber on the elastic membrane in one unit with a ring-shaped vertical wall enclosing the elastic membrane; a first supporting membrane and a second supporting membrane which have an open portion formed at a location corresponding to the elastic membrane are provided in order to clamp the elastic partition member from the front and the back, and a projection portion is provided at a location which is in contact with the ring shape vertical wall portion of the first supporting member which is turned down in the central direction or the opposite outer direction of the elastic membrane.

* * * * *